United States Patent

Kobayashi

[11] 4,220,225
[45] Sep. 2, 1980

[54] DISC BRAKE
[75] Inventor: Kinzo Kobayashi, Yokohama, Japan
[73] Assignee: Tokico Ltd., Kanagawa, Japan
[21] Appl. No.: 914,745
[22] Filed: Jun. 7, 1978
[30] Foreign Application Priority Data
Jun. 16, 1977 [JP] Japan .................................. 52-78666
[51] Int. Cl.² ........................................... F16D 65/02
[52] U.S. Cl. ................................................. 188/73.6
[58] Field of Search ...................... 188/73.3, 73.6, 72.4
[56] References Cited
U.S. PATENT DOCUMENTS

| | | | |
|---|---|---|---|
| 3,920,104 | 11/1975 | Hoffmann | 188/73.3 |
| 4,072,214 | 2/1978 | Haraikawa et al. | 188/73.6 X |
| 4,072,217 | 2/1978 | Inoue et al. | 188/73.6 |

Primary Examiner—Duane A. Reger
Attorney, Agent, or Firm—Wenderoth, Lind & Ponack

[57] ABSTRACT

A disc brake including a stationary caliper holder with a caliper slidably mounted thereon. The caliper holder having respective pairs of inner and outer arms for slidably mounting inner and outer friction pads between the inner and outer arms, projection-and-recess engagement between the backing plates of the friction pads and the inner and outer arms, and an outer beam connecting the outer arms of the caliper holder and extending on the outside or back side of the friction pad. The distance between the inner end surface of the outer beam and the outer end portions of the outer arms which engage with the backing plate of the corresponding friction pad is larger than the thickness of the backing plate so that the friction pad can easily be removed from the disc brake.

2 Claims, 4 Drawing Figures

DISC BRAKE

BACKGROUND OF THE INVENTION

This invention relates to improvements in disc brakes of the type wherein a pair of friction pads disposed on opposite sides of a rotatable disc are mounted on a stationary member or caliper holder so as to be displaced only in the direction of the axis of the disc.

Usually the friction pads engage with the caliper holder by means of projections on the caliper holder engaging with recesses on the friction pads such that projecting guide portions or grooves formed in the opposite ends of the backing plates of the friction pads, and extending in the direction of the axis of the disc, engage with correspondingly shaped grooves or projections formed in the caliper holder. The friction pads are movable only in the direction of the axis of the disc and movement in a direction radially inwardly or outwardly relative to the disc can reliably be prevented when actuating the brake. However, in removing the friction pads from the disc brake it is necessary to displace the respective friction pads in a direction away from the disc.

The caliper holder of the disc brakes of the aforementioned type normally comprises a first pair of arms spaced a predetermined distance in the direction of the circumference of the disc and disposed on one side of the disc, a second pair of arms spaced a predetermined distance in the direction of the circumference of the disc and disposed on a second side of the disc, bridge portions disposed outside of the circumference of the disc and extending generally in the direction of the axis of the disc and connecting the arms of the first pair of arms to the respective arms of the second pair of arms on the second side of the disc, and an inner beam connecting the first pair of arms and adapted to be secured to a non-rotatable part of a vehicle.

The disc brakes having such a structure function satisfactorily, but the second pair of arms are prone to be forced away from each other in the direction of the circumference of the disc since brake torque is transmitted through the arms in actuating the brake, and thus some prior art brakes of the aforementioned type further comprise an outer beam connecting the second pair of arms such as shown in Japanese Utility Model Disclosure 51-113586.

However, when an outer beam is disposed on the back side of the rear surface of the backing plate of the friction pad mounted between the second pair of arms it is not possible, or at least is very difficult to remove the friction pad from the disc brake when replacing worn pad with a new pad, particularly when the space in the vehicle provided for mounting the disc brake is limited and, in some cases, it is necessary to remove the disc brake assembly from the vehicle to exchange the friction pads.

SUMMARY OF THE INVENTION

An object of the present invention is to overcome the shortcomings mentioned above by providing a brake wherein the distance between the inner end surface of the outer beam facing the rear surface of the backing plate of the friction pad, and the outer end surfaces of the portions of the second pair of arms engaging at the projection-and-recess portions of the backing plate and friction pad, is larger than the thickness of the backing plate, so that the friction pad can easily be extracted from or inserted into the disc brake.

BRIEF DESCRIPTION OF THE DRAWINGS

The foregoing and other objects and advantages of the present invention will be readily apparent to those skilled in the art from the following description when considered together with the accompanying drawings, in which.

DETAILED DESCRIPTION OF THE PREFERRED EMBODIMENT

Figure 1:
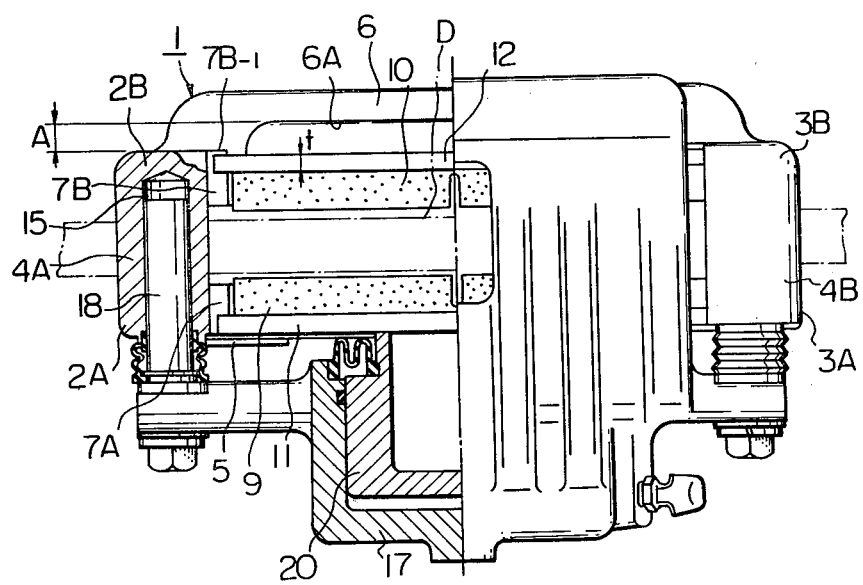
FIG. 1 is a plan view, partly in section, of a disc brake according to the present invention.

Shown in FIG. 1 in the drawings is a stationary member or caliper holder 1 adapted to be secured to a non-rotatable part of a vehicle and comprising a pair of arm portions 2A and 3A which are disposed on one side of a rotatable disc D and spaced a predetermined distance in the direction of the circumference of the disc, another pair of arm portions 2B and 3B are disposed on the other side (the upper side in FIG. 1) of the disc D and spaced a predetermined distance (substantially equal to the first mentioned distance) in the direction of the circumference of the disc, bridge portions 4A and 4B are disposed outside of the circumference of the disc and extend generally in the direction of the axis of the disc D (vertical direction in FIG. 1) and connect respectively, the arm portions 2A and 2B, and 3A and 3B, and an inner beam 5 is disposed on one side of the disc which connects one pair of arm portions 2A and 3A and has internally threaded bores (FIGS. 2 and 3) to receive bolts or the like for securing the caliper holder to the non-rotatable part of the vehicle. The caliper holder 1 further comprises an outer beam 6 which is disposed on the other side of the disc which connects the arm portions 2B and 3B with one another.

The arm portions 2A and 3A, and 2B and 3B respectively have guide portions 7A and 8A, and 7B and 8B projecting from the circumferentially inner or oppositely facing surfaces, and which extend in the direction of the axis of the disc D. Guided between the guide portions 7A and 8A and between the guide portions 7B and 8B are friction pads 9 and 10, and backing plates 11 and 12 which have, in the circumferentially opposite ends, groove portions 13A and 14A, and 13B and 14B for engaging with guide portions 7A and 8A, and 7B and 8B thereby forming a projection-and-recess engagement therebetween. Thus, the friction pads 9 and 10 are mounted on the caliper holder 1 and are allowed to move only in the direction of the axis of the disc D, and movement of the friction pad 9 or 10 in the direction radially outward relative to the disc D which is prone to occur in a conventional disc brake when the brake is severely actuated, is prevented.

The caliper holder 1 further includes guide bores 15 and 16 formed in bridge portions 4A and 4B respectively extending in the direction of the axis of the disc D. The guide bores 15 and 16 slidably receive guide pins 18 and 19 which are secured by means of screw threads to a caliper 17, whereby the caliper 17 is supported on the caliper holder 1 so as to move in the direction of the axis of the disc D. A hydraulic actuator comprising a piston 20 incorporated in the caliper 17 on the side of the inner beam 5. In actuating the brake, the piston 20 presses the friction pad 9 through the backing 11 against one side surface of the disc D, and a reaction force moves the caliper 17 in the opposite direction (downward as viewed in FIG. 1) so that finger portions 17A of the caliper 17 press the friction pad 10 against the other side surface of the disc D.

Now, the relation between the outer beam 6 and the backing plate 12 of the friction pad 10, according to the present invention, will be explained.

Figure 3:
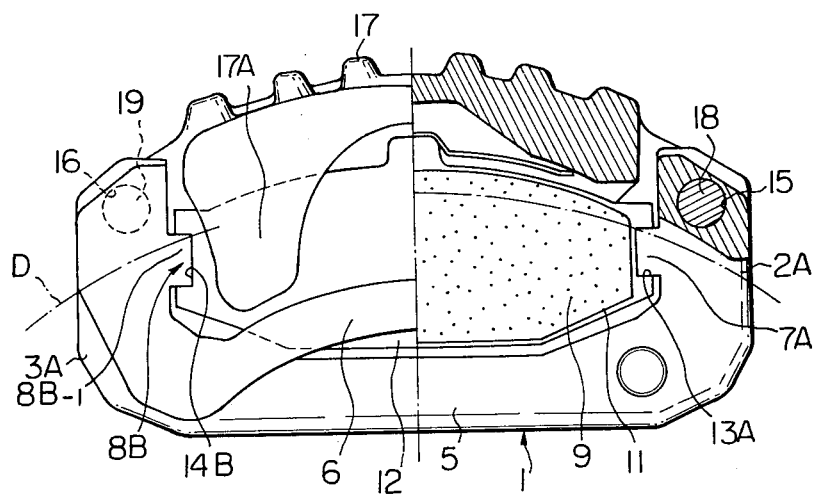
FIG. 3 is rear view thereof, partly in section.

The outer beam 6 extends generally parallel to the surface of the disc D outside the rear surface of the backing plate 12, and is has a generally arcuate shape as seen in FIG. 3 so that the disc brake can easily be mounted in a limited space in the vehicle. At least a portion of the outer beam 6 is disposed on the back side (as viewed in the direction of the axis of the disc) of the rear surface of the backing plate 12. According to the present invention, a distance A defined between inner end surface 6A of the outer beam 6 which faces the rear surface of the backing plate 12 and outer end surfaces 7B-1 and 8B-1 of the projecting guide portions 7B and 8B is greater than the thickness t of the backing plate 12, so that the friction pad 10 can easily be replaced or removed from the disc brake.

Figure 2:
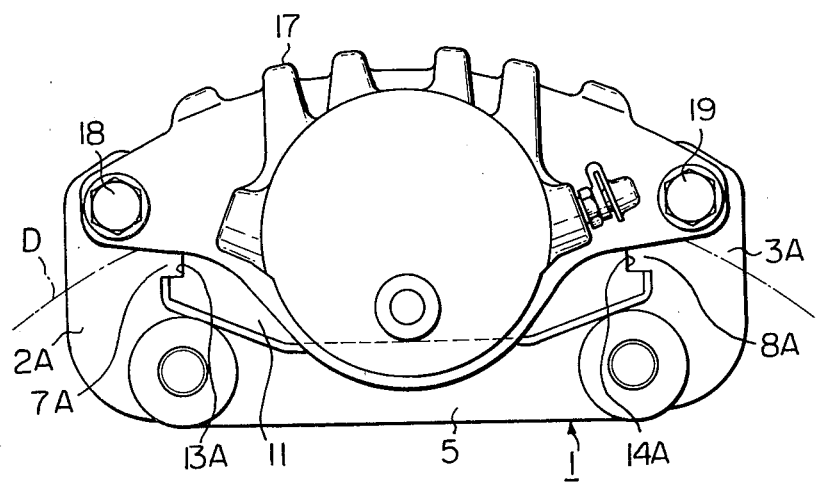
FIG. 2 is a front view of the disc brake of FIG. 1.
Figure 4:
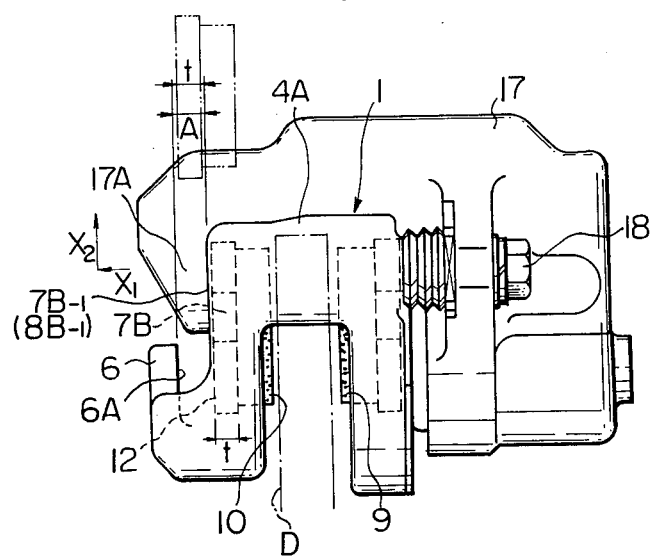
FIG. 4 is a left side view thereof.

In removing the friction pads 9 and 10 from the disc brake, one of the pins 18 and 19 is first removed, and the caliper 17 is rotated pivotally about the other remaining pin, 19 or 18, so that the caliper 17 moves upward (radially outward) and sideways (in the direction of the circumference of the disc) relative to the friction pads 9 and 10. The friction pad 9 can simply be removed by displacing the friction pad 9 in the direction of the axis of the disc 9 along the guide portions 7A and 8A as shown in FIGS. 1 and 2. The friction pad 10 can be removed by displacing it in the direction of arrows $X_1$ and $X_2$ as shown in FIG. 4. The arrow $X_1$ shows that the friction pad 10 is first displaced in the direction of the axis of the disc D until the groove portions 13B and 14B of the backing plate 12 disengage from guide portions 7B and 8B, then, the friction pad 10 is moved radially outward as shown by arrow $X_2$ so that the backing plate 12 clears the outer beam 6.

In assembling new friction pads 9 and 10 into the disc brake it is sufficient to perform the process in reverse. As a result, the friction pads can easily be exchanged without removing the caliper holder 1 bodily from the vehicle.

In the embodiment, projecting guide portions are formed on the arm portions of the preferred caliper holder and grooves cooperating with the guide portions are formed in the backing plates of the friction pads but, alternatively, the arm portions of the caliper holder may have the grooves extending in the direction of the axis of the disc for receiving the projecting guide portions, which are provided on circumferentially opposite ends of the backing plates of the friction pads, therein. In short, the present invention may be applied to disc brakes of any type wherein arm portions engage with friction pads in projection-and-recess engagement relation, and where at least a portion of a beam connecting the arm portions is disposed on the back side of the rear surface of the backing plate of at least one friction pad.

As described above in detail, the friction pad disposed on the side of the outer beam can, according to the present invention, easily be replaced without removing the caliper holder from the vehicle even though the outer beam is disposed on the backside of the friction pad. Thus, the invention is particularly useful in heavy duty vehicles such as trucks or the like wherein sufficient space for mounting the disc brake is not provided on or around the wheels of the vehicle and the braking force is very large making the friction pads prone to move in a radially outward direction relative to the disc.

Further, the clearance in the projection-and-recess engaging portions between the caliper holder and the friction pads in the direction of the radius of the disc (vertical direction in FIG. 2) can be minimized and, accordingly, it is possible to control movement of the friction pad reliably and so that it is solely in the direction of the axis of the disc thereby minimizing rattling noise of the brake.

What is claimed is:

1. A disc brake comprising:

a disc;

a caliper holder adapted to be secured to a nonrotatable part of a vehicle;

a first pair of arm portions on said caliper holder, said arm portions of said first pair being spaced with respect to each other on one side of said disc and located radially inward from the outer circumference of said disc and extending in a generally radial direction with respect to said disc;

a second pair of arm portions on said caliper holder, said arm portions of said second pair being spaced from said first pair of arm portions in the axial direction and adjacent to the other side surface of said disc, said second pair of arm portions extending in a generally radial direction with respect to said disc;

backing plates mounted on said first and second pairs of arm portions for movement toward and away from said disc and having friction pads on the surface thereof facing said disc and terminating short of the portion of the backing plates mounted on said arm portions;

bridge means located outside the circumference of said disc, and extending across the disc in an axial direction relative to said disc, and rigidly connecting respectively the generally radially extending corresponding outer ends of said arm portions of said first and second pair of arm portions;

an inner beam disposed on one side of said disc and connecting said first pair of arm portions; and an outer beam disposed on the other side of said disc and connecting said second pair of arm portions at respective radially inner ends of said second pair of arm portions, said outer beam having an arcuate shape and having the central portion of said outer beam positioned radially outside an imaginary line between the ends of said outer beam, said outer beam additionally being spaced in an axial direction relative to the disc away from said second pair of arm portions by a distance greater than the thickness of said backing plates and said outer beam overlapping, when viewed in the direction of the axis of said disc, said backing plate which is adjacent to said outer beam.

2. A disc brake as set forth in claim 1 wherein said pairs of arm portions have projections extending in a direction parallel to the axis of said disc; and said backing plates having grooves for engaging with said projections of said pairs of arm portions for mounting said backing plate with said friction pads on said caliper holder.

* * * * *